US008027048B2

(12) United States Patent
Testardi et al.

(10) Patent No.: US 8,027,048 B2
(45) Date of Patent: Sep. 27, 2011

(54) METHOD AND ARTICLE FOR DETERMINING USE OF CONSUMABLE ITEMS IN AN IMAGE-FORMING DEVICE

(75) Inventors: Stephen L. Testardi, Boise, ID (US); Michael J. Borg, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1033 days.

(21) Appl. No.: 11/862,248

(22) Filed: Sep. 27, 2007

(65) Prior Publication Data

US 2009/0086251 A1 Apr. 2, 2009

(51) Int. Cl.
*G03G 15/00* (2006.01)
*G06K 15/00* (2006.01)

(52) U.S. Cl. ............ 358/1.14; 358/1.1; 347/19; 347/85; 347/86; 399/12

(58) Field of Classification Search ................. 358/1.14; 347/19, 85, 86; 399/12
See application file for complete search history.

(56) References Cited

U.S. PATENT DOCUMENTS 5,184,181 A 2/1993 Kurando et al.
5,975,688 A 11/1999 Kanaya et al.
5,995,774 A 11/1999 Applegate et al.
6,158,837 A 12/2000 Hilton et al.
6,375,308 B1 4/2002 Shimada
6,808,245 B2 10/2004 Katayama
6,996,347 B2 2/2006 Ito et al.
7,050,726 B2 5/2006 Adkins et al.
7,083,272 B2 8/2006 Silverbrook
7,101,014 B2 * 9/2006 Johnson et al. ................ 347/19
7,221,878 B2 * 5/2007 Chen ................................ 399/12
7,369,784 B2 * 5/2008 Ishihara et al. ................ 399/12
2005/0156999 A1 7/2005 Silverbrook
2005/0157003 A1 7/2005 Silverbrook
2005/0286913 A1 * 12/2005 Adkins et al. .................. 399/12
2006/0050103 A1 3/2006 Naka
2007/0139493 A1 6/2007 Campbell et al.

FOREIGN PATENT DOCUMENTS

JP 05193127 8/1993

* cited by examiner

*Primary Examiner* — King Poon
*Assistant Examiner* — Lawrence Wills

(57) ABSTRACT

An image-forming device and method for determining use of consumable items therein includes a consumable item memory storing a substantially unique identifier designating the consumable item as one of a starter item and a normal item. A computer program retrieves the identifier from the consumable item memory and determines whether to allow formation of images using the consumable item based on whether the consumable item is a starter item or a normal item.

20 Claims, 5 Drawing Sheets

METHOD AND ARTICLE FOR DETERMINING USE OF CONSUMABLE ITEMS IN AN IMAGE-FORMING DEVICE

BACKGROUND

An image-forming device includes a consumable item that is used by the image-forming device to form images on sheets of media. Such a consumable item is normally periodically replaced by the user. For example, such a consumable item may be an inkjet cartridge where the image-forming device is an inkjet-printing device or a toner cartridge where the image-forming device is a laser-printing device.

New image-forming devices are commonly sold with a "starter" consumable item. Starter consumable items often have a lower yield (i.e., can print fewer pages) than aftermarket consumable items from the original equipment manufacturer (OEM). However, the inclusion of a starter consumable item with the image-forming device allows the user to make immediate use of the image-forming device, and also demonstrates to the user the quality of OEM consumable items.

In many emerging geographies, sales of image-forming devices and aftermarket consumable items are adversely affected by a practice referred to as "ramping." Ramping is a practice whereby consumable items that are intended for sale with the image-forming system are removed from the box by resellers, and sold separately. In many cases, the consumable items that are "ramped" are starter consumable items having a lower print yield than typical aftermarket consumable items. The separate sale of the image-forming device and the ramped consumable item results in increased profit for the reseller, but hurts the purchaser/user in several ways. Specifically, the purchaser does not get the complete product for which they paid, because no consumable item is included with the image-forming system. In addition, if a ramped starter consumable item is purchased as a standalone consumable, the user receives a lower yielding consumable item than expected. Further, if a non-OEM consumable item is purchased from the outset, the user is unable to experience and evaluate the quality of OEM consumable items. It would be useful to reduce or eliminate ramping and its associated problems by reducing or eliminating the demand for ramped consumable items.

BRIEF DESCRIPTION OF THE DRAWINGS

The present invention is illustrated by way of example and not limited by the figures of the accompanying drawings. The same numbers are used throughout the figures to reference like components and/or features.

DESCRIPTION

Figure 1A:
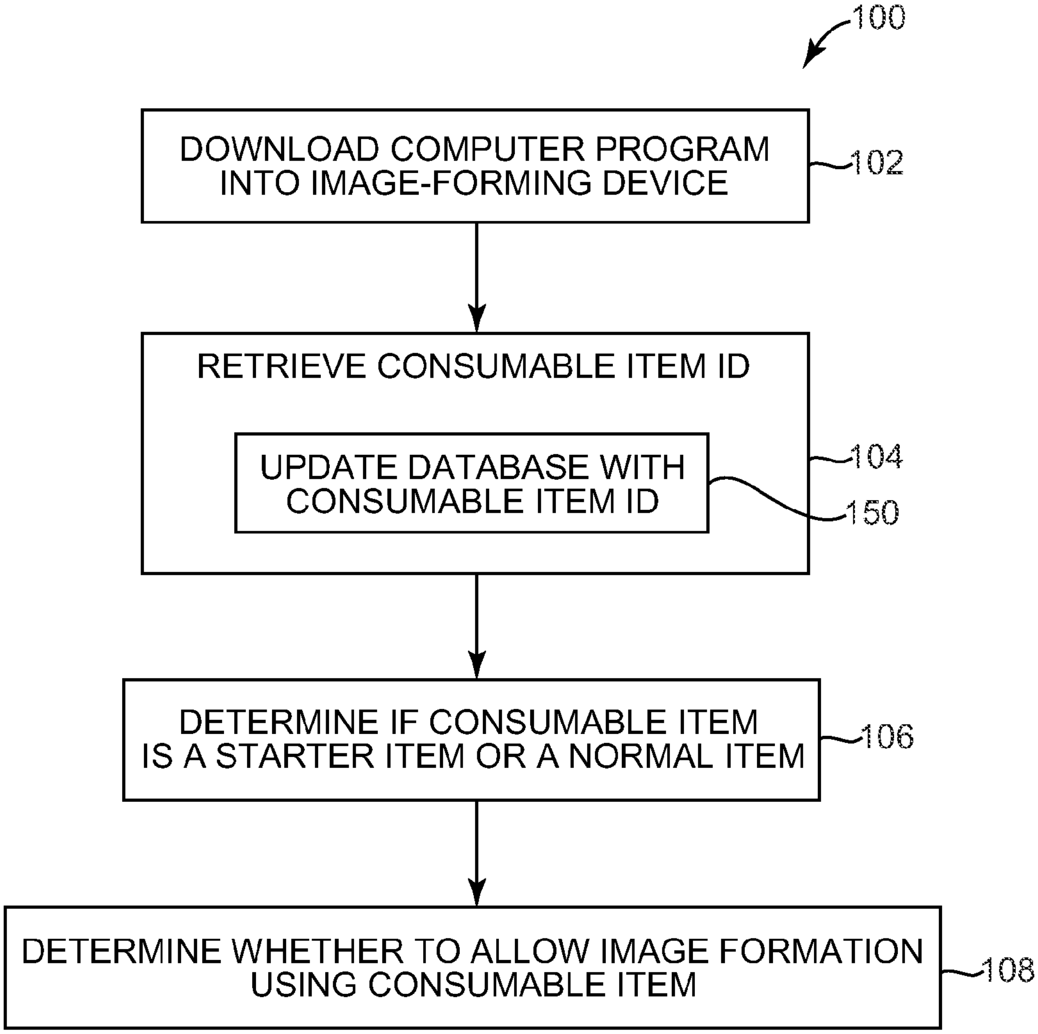
FIG. 1A is a flowchart of a method for determining use of a consumable item for an image-forming device, according to an embodiment of the present disclosure.

FIG. 1A shows a method 100 for determining use of a consumable item for an image-forming device, according to an embodiment of the present disclosure. The image-forming device may be a laser-printing device, an inkjet-printing device, or another type of image-forming device. The consumable item may be an inkjet cartridge, a toner cartridge, or another type of image-forming device consumable item. The image-forming device uses the consumable item to form images on sheets of media like paper. For instance, the image-forming device may eject ink supplied by a consumable item to form images on media sheets. As another example, the image-forming device may apply and fuse toner supplied by a consumable item to form images on media sheets.

The consumable item is either a "starter" consumable item, or a "normal" consumable item. As used herein, a "starter" consumable item is a consumable item intended only for inclusion with the sale of an image-forming device, and not intended for sale separately from an image-forming device. A "normal" consumable item is a consumable item intended for sale separately from an image-forming device. Normal consumable items are generally understood to be superior to starter consumable items in some manner independent of product quality, such providing a higher print yield (i.e., normal consumable items can typically print more pages than starter consumable items).

As depicted in FIG. 1A, the method 100 is substantially performed by a computer program. The computer program can be performed by the image-forming device itself, or in another embodiment, by a computing device to which the image-forming device is communicatively connected.

In one embodiment, the method 100 downloads the computer program into the image-forming device at 102. In this embodiment, the image-forming device is not shipped for purchase and/or usage by the user with the computer program already installed. Rather, the image-forming device downloads the computer program, such as from a connected computing device during installation of driver software, or over a network from a computing device such as a web server operated by or for the manufacturer of the image-forming device.

Downloading the computer program into the image-forming device is inclusive of running the computer program cooperatively between the image-forming device and such a web server via execution of a small computer program known as a web applet. In such instance, the computer program is substantially executed by the web server, but at least some parts may be considered as running on the image-forming device, such as those aspects that retrieve information regarding the image-forming device or the consumable item that has been installed into the image-forming device. In another embodiment, however, the image-forming device may be shipped for purchase and/or usage by the user with the computer program already installed.

In either case, the computer program retrieves a consumable item identifier of the consumable item at 104. The consumable item identifier is retrieved from a memory, such as a non-volatile memory, that is part of the consumable item itself. The consumable item identifier is an at least substantially unique identifier, in that the identifier at least substantially uniquely identifies the consumable item as compared to other consumable items of the same type or kind. In addition, the consumable item identifier includes information or coding that designates the consumable item as either a starter consumable item or a normal consumable item. In one embodiment, the at least substantially unique identifier of the consumable item is a serial number of the consumable item. In this instance, the identifier is in fact likely to be completely unique, since serial numbers are desirably not repeated. In another embodiment, the at least substantially unique identifier of the consumable item is sufficiently unique in that it is likely to identify the consumable item as compared to most other consumable items of the same kind, but may not be completely unique, in that one or more other consumable items of the same kind may have the same identifier. An example of such an identifier is a lot number that specifies when the consumable item in question was manufactured, and where the item was manufactured. For the remainder of this patent application, the terminology "consumable item identifier" is used as shorthand to mean an at least substantially unique identifier of the consumable item that also designates the consumable item as either a starter consumable item or a normal consumable item.

After retrieving the consumable item identifier at 104, the computer program determines if the consumable item is a starter consumable item or a normal consumable item at 106, and then determines whether to allow the image-forming device to form an image using the consumable item at 108.

Figure 1B:
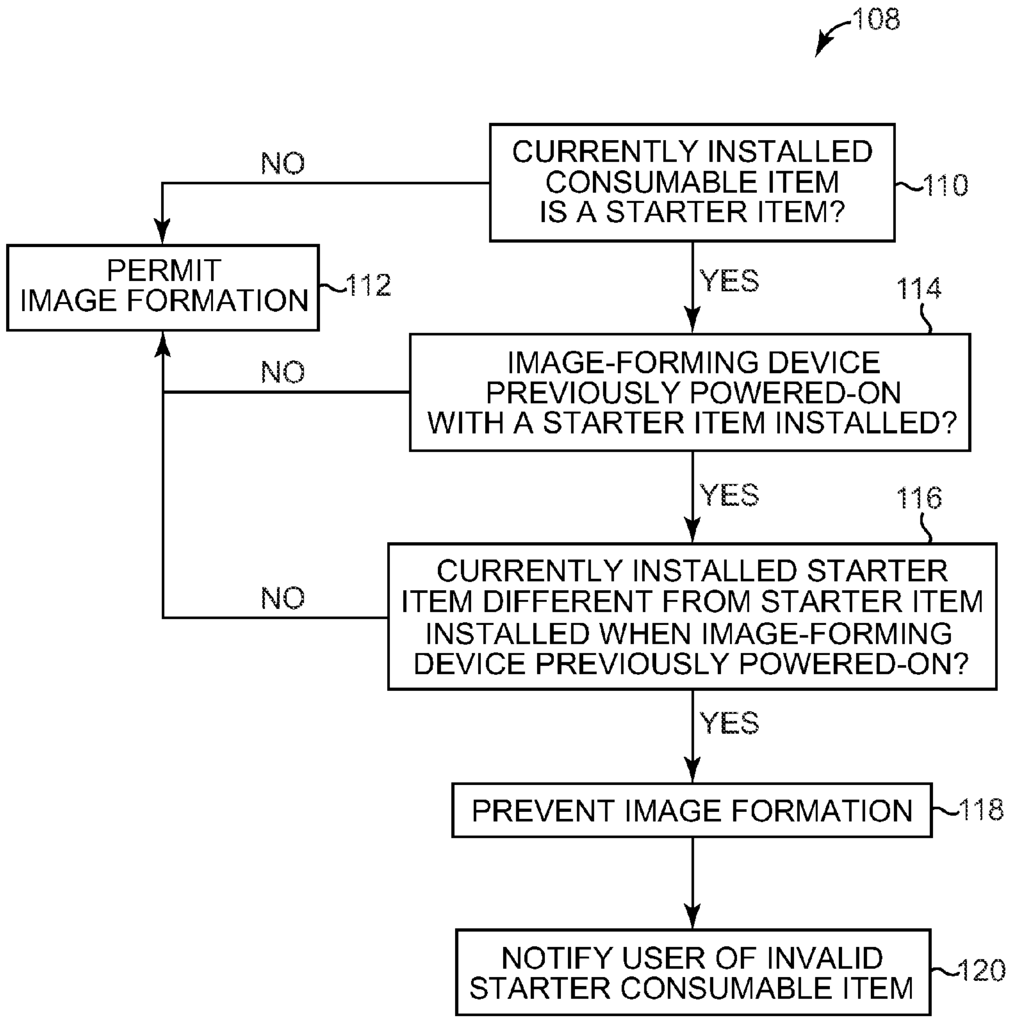
FIG. 1B is a flowchart of a method for determining whether to allow an image-forming device to form an image using a consumable item.

Referring to FIG. 1B, a process for determining whether to allow the image-forming device to form an image using the consumable item (108) is illustrated, according to one embodiment. At 110, the currently installed consumable item is identified as either a normal consumable item or a starter consumable item. If the currently installed consumable item is a normal consumable item, formation of images using the installed consumable item is permitted at 112.

If the currently installed consumable item is a starter consumable item, at 114 it is determined whether the image-forming device has previously been powered-on with a starter consumable item installed. If the image-forming device has not previously been powered-on with a starter consumable item installed, formation of images using the installed consumable item is permitted at 112.

If the image-forming device has previously been powered-on with a starter consumable item installed, at 116 it is determined whether the currently installed starter consumable item is different from the starter consumable item that was installed during the previous power-up of the image-forming device. If the currently installed starter consumable item is not different from the starter consumable item that was installed during the previous power-up of the image-forming device, formation of images using the installed consumable item is permitted at 112.

If at 116 it is determined that the currently installed starter consumable item is different from the starter consumable item that was installed during the previous power-up of the image-forming device, formation of images using the installed consumable item is prevented at 118, and the user is notified that the currently installed starter consumable item is invalid for use in the image-forming system at 120. The user may be notified such as by a message on a display of the image-forming system or by a message on a display of an associated computing system from which the image-forming device receives data to be formed as images.

Using the process of FIG. 1B, an image-forming device can accept only one starter consumable item. After an image-forming device has been powered-on with a starter consumable item installed, the image-forming device will not subsequently print with any other starter consumable item. Accordingly, demand for ramped starter consumable items will be reduced.

Figure 1C:
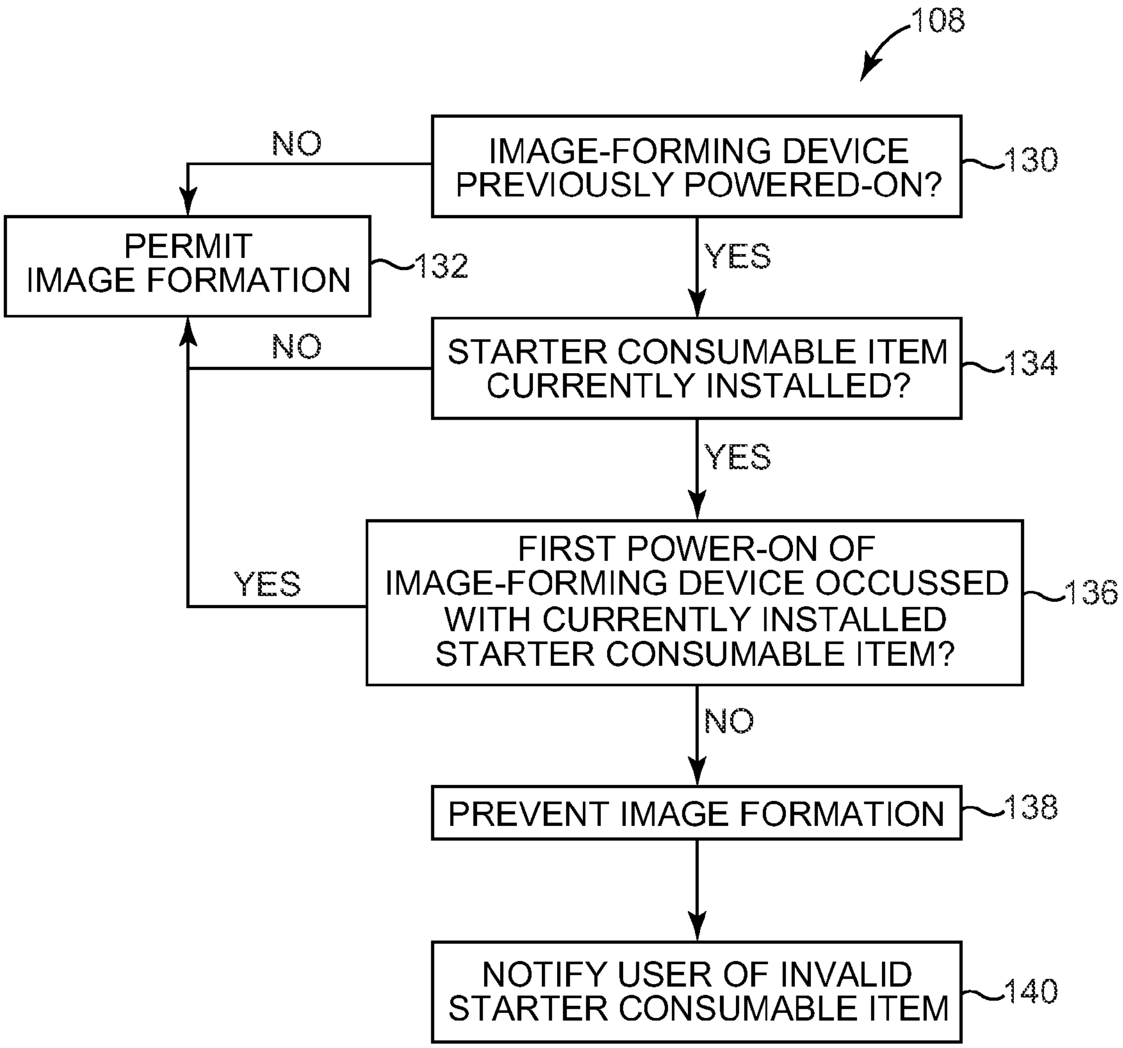
FIG. 1C is a flowchart of another method for determining whether to allow an image-forming device to form an image using a consumable item.

Referring to FIG. 1C, another process for determining whether to allow the image-forming device to form an image using the consumable item (108) is illustrated, according to one embodiment. At 130, it is determined whether the image-forming device has previously been powered-on with a consumable item installed in the image-forming device. If the image-forming device has not previously been powered-on with a consumable item installed (i.e., it is the first time the image-forming device has been powered-on by the user), formation of images using the installed consumable item is permitted at 132. That is, the first time the image-forming device is powered-on with a consumable item installed, the formation of images is permitted regardless of the type (starter or normal) of consumable item installed.

If the image-forming device has previously been powered-on, at 134 it is determined whether a starter consumable item is installed. If a starter consumable item is not installed (i.e., a normal consumable item is installed), formation of images using the installed normal consumable item is permitted at 132.

If at 134 it is determined that a starter consumable item is installed, then at 136 it is determined whether the initial power-on of the image-forming device occurred with the currently installed starter consumable item. If the initial power-on of the image-forming device occurred with the currently installed starter consumable item, formation of images using the installed starter consumable item is permitted at 132.

If at 136 it is determined that the initial power-on of the image-forming device did not occur with the currently installed starter consumable item, formation of images with the installed starter consumable item is prevented at 138, and the user is notified that the currently installed starter consumable item is invalid for use in the image-forming system at 140. The user may be notified such as by a message on a display of the image-forming system or by a message on a display of an associated computing system from which the image-forming device receives data to be formed as images.

Using the process of FIG. 1C, an image-forming device can only accept a starter consumable item the first (e.g., initial) time the image-forming device is powered-on. If an image-forming device is initially powered-on with a starter consumable item installed, only that starter consumable item will work in the image-forming device. Any subsequently installed starter consumable items will not work in the image-forming device. If an image-forming device is initially powered-on with anything other than a starter consumable item installed, the image-forming device will not subsequently accept a starter consumable item. Accordingly, demand for ramped starter consumable items is eliminated.

In one embodiment, determining whether the currently installed consumable item is different from a previously installed consumable item (such as at 116 of FIG. 1B and 136 of FIG. 1C) is accomplished by recording the consumable item identifier of each installed item in a database or registry. In one embodiment, at 150 (FIG. 1A) the computer program may update a database with an entry corresponding to the consumable item identifier, where the consumable item identifier was retrieved from the consumable item at 104. In one embodiment, the database is stored in memory of the image-forming device. The purpose of updating such a database in this manner is so that the identity of consumable items that are installed or inserted in an image-forming device over various periods of time can be tracked.

Figure 2:
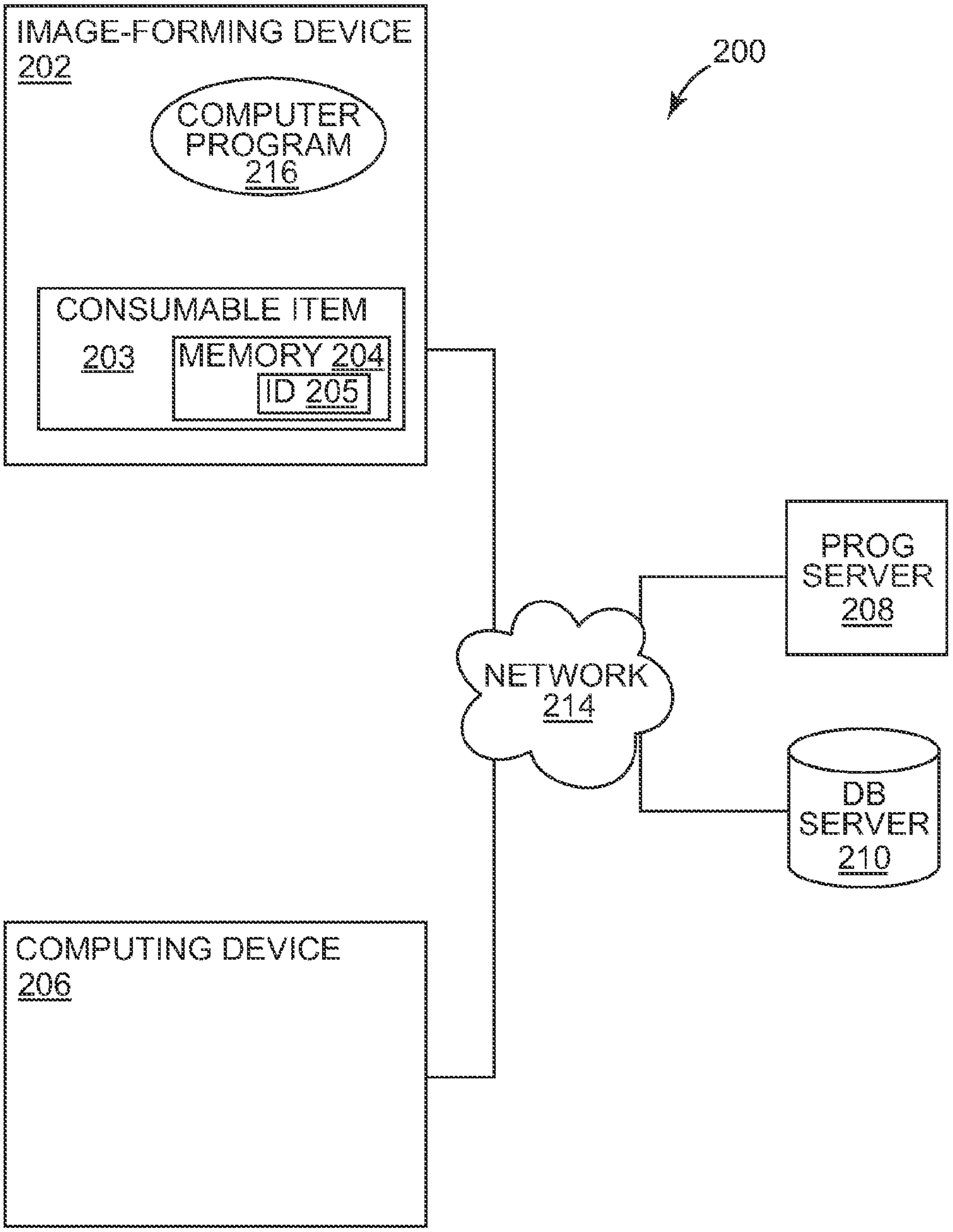
FIG. 2 is a block diagram of a system in relation to which method for determining use of a consumable item for an image-forming device can be performed, according to an embodiment of the present disclosure.

FIG. 2 shows a system 200 in relation to which the method 100 can be performed, according to an embodiment of the present disclosure. The system 200 includes an image-forming device 202 into which a consumable item 203 has been inserted or installed, for forming images on media. The consumable item 203 includes a memory 204 storing a consumable item identifier 205. The system 200 also includes a computing device 206 from which the image-forming device 202 receives data to be formed as images on media. The system 200 may also include a network 214 to which the image-forming device 202 and/or the computing device 206 are communicatively connected. The network 214 may be or include one or more of: the Internet, intranets, extranets, wired networks, wireless networks, local-area networks (LAN's), and wide-area networks (WAN's), among other types of networks. The system 200 may further include one or more of a program server 208 and a database server 210, each of which may also be communicatively connected to the network 214. It is noted that while the servers 208, 210 are depicted as discrete servers in FIG. 2, in one embodiment, one or more the servers 208, 210 may have their respective functionalities combined in a single computing device, such as a single server, as can be appreciated by those of ordinary skill within the art.

The image-forming device 202 includes a computer program 216. The computer program 216 may be pre-installed within the image-forming device 202, so that it is available for execution at the time of shipment for purchase and/or use by the user. Alternatively, the computer program 216 may be downloaded from the computing device 206 or the program server 208, such as upon installation of print-driver software on computing device 206.

The computer program 216 performs the functionality ascribed to the computer program in the method 100. As such, the computer program 216 retrieves the consumable item identifier 205 from the memory 204 of the consumable item 203, which is installed or inserted into the image-forming device 202. The computer program 216 determines if the installed consumable item 203 is a starter item or a normal item, and then determines whether to allow the formation of images using the installed consumable item 203. If the formation of images is prevented, the computer program 216 notifies the user that an invalid consumable item is installed in the image-forming system. The computer program 216 determines whether the image-forming device 202 has previously been powered-on, and identifies which consumable item 203 was installed when the image-forming device was previously powered-on. The computer program 216 determines whether the currently installed consumable item 203 has previously been installed in the image-forming device 202. In one embodiment, the computer program 216 may send the image-forming device identifier 205 to the database server 210 over the network 214, so that a database maintained by the database server 210 can be updated, as has been described.

It is noted that the computer program 216 may be stored on a computer-readable medium. Examples of such computer-readable medium include volatile and non-volatile memory, semiconductor memory like dynamic random-access memory (DRAM), magnetic media like hard disk drives, and/or optical media such as compact disc read-only memory (CD-ROM) discs and digital versatile discs (DVD's). The computer program 216 may be stored on other types of computer-readable media as well.

Figure 3:
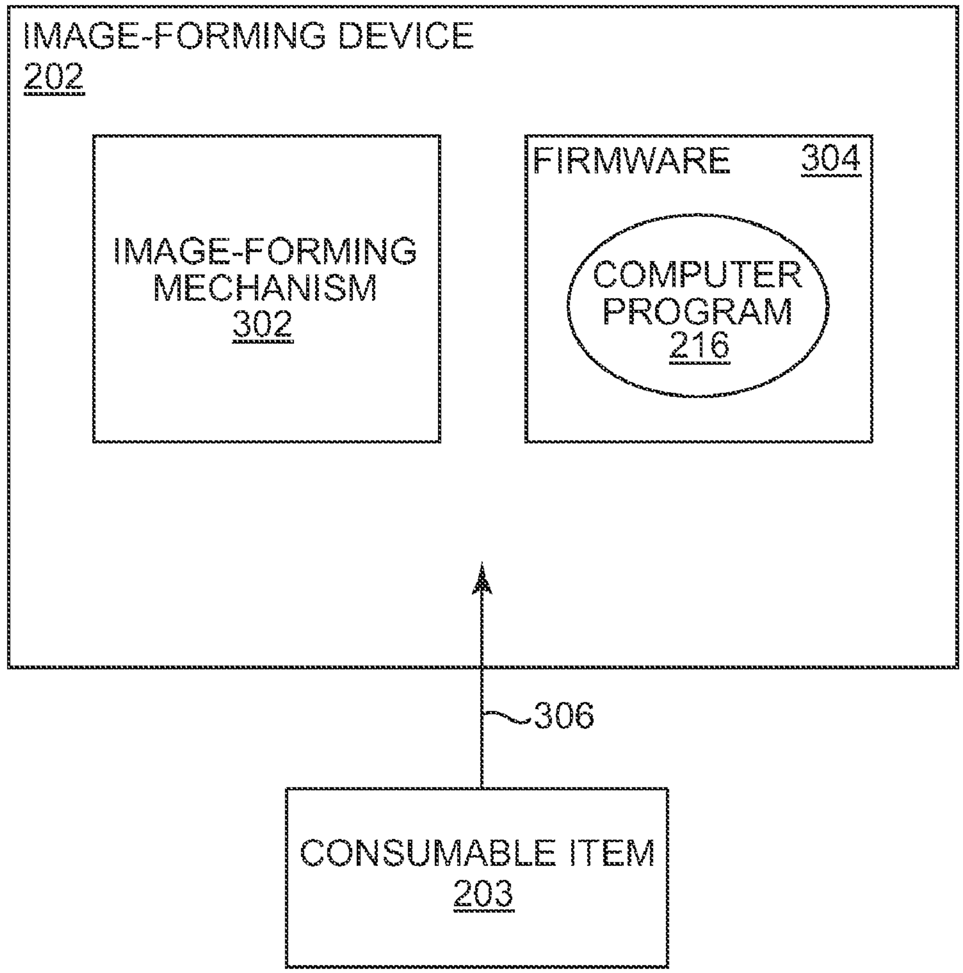
FIG. 3 is a block diagram of an image-forming device, according to an embodiment of the present disclosure.

FIG. 3 shows a rudimentary block diagram of the image-forming device 202, according to an embodiment of the invention. The image-forming device 202 is depicted in FIG. 3 as including an image-forming mechanism 302 and firmware 304. Those of ordinary skill within the art can appreciate that the image-forming device 202 can include other components, in addition to and/or in lieu of the image-forming mechanism 302 and the firmware 304. In addition, the image-forming device 202 is receptive to installation or insertion of the consumable item 203, as indicated by the arrow 306.

The image-forming mechanism 302 may be a laser-printing mechanism where the image-forming device 202 is a laser-printing device, an inkjet-printing mechanism where the image-forming device 202 is an inkjet-printing device, or another type of image-forming mechanism. Where the image-forming mechanism 302 is a laser-printing mechanism, the consumable item 203 may be a toner cartridge. Where the image-forming mechanism 302 is an inkjet-printing mechanism, the consumable item 203 may be an inkjet cartridge.

The firmware 304 includes one or more computer programs, including the computer program 216, which are typically stored in non-volatile memory. As such, the image-forming device 202 may be shipped for purchase and/or usage by the user with the computer program 216 already stored within the firmware 304. As another example, the computer program 216 may be downloaded into the firmware 304 over a network, such as from the computing device 206 or the program server 208 over the network 214.

It is noted that although the functional components of the system 200 are shown in specific locations, the functional components may alternatively be located within the image-forming device 202, the consumable item 203, the computing device 206, the program server 208, the database server 210, the computer program 216, the image-forming mechanism 302, or the firmware 304, provided the functionality of the system 200 is preserved.

Although the invention has been described in language specific to structural features and/or methodological steps, it is to be understood that the invention defined in the appended claims is not necessarily limited to the specific features or steps described. Rather, the specific features and steps are disclosed as representative or exemplary forms of implementing the claimed invention.

We claim:

1. A method comprising:

providing a consumable item for an image-forming device, the consumable item having a substantially unique identifier of the consumable item stored in a memory thereof, and the substantially unique identifier designating the consumable item as one of a starter item and a normal item; and upon installation of the consumable item in the image-forming device and powering-on of the image forming device, retrieving, by a computer program, the substantially unique identifier from the memory of the consumable item;

determining, by the computer program, whether the consumable item is a starter item or a normal item based on the substantially unique identifier; and determining, by the computer program, whether to allow formation of images using the consumable item based on whether the consumable item is a starter item or a normal item, wherein, if the consumable item is a starter item and the image-forming device has previously been powered-on with one of a different starter item and a normal item installed in the image-forming device, preventing formation of images using the consumable item, wherein, if the consumable item is a starter item and the image-forming device has previously been powered-on with the same starter item installed in the image-forming device, allowing formation of images using the consumable item.

2. The method of claim 1, wherein, if the consumable item is a normal item, permitting formation of images using the consumable item.

3. The method of claim 1, further comprising, if the image-forming device has previously been powered-on with a different starter item installed in the image-forming device, notifying a user that the consumable item is an invalid starter item.

4. The method of claim 1, wherein determining whether to allow formation of images using the consumable item comprises determining if the image-forming device has previously been powered-on with any consumable item installed.

5. The method of claim 4, wherein, if the image-forming device has not previously been powered-on with any consumable item installed, permitting formation of images using the consumable item.

6. The method of claim 4, further comprising, if the image-forming device has previously been powered-on with a different starter item or a normal item installed in the image-forming device, notifying a user that the consumable item is an invalid consumable item.

7. The method of claim 1, further comprising downloading the computer program into the image-forming device from a computing device, the image-forming device executing the computer program.

8. The method of claim 1, wherein determining whether to allow formation of images using the consumable item comprises limiting the number of starter items useable by the image-forming device to one starter item.

9. The method of claim 1, wherein the computer program is executed by the image-forming device.

10. The method of claim 1, wherein the substantially unique identifier of the consumable item is a serial number of the consumable item.

11. The method of claim 1, wherein the substantially unique identifier of the consumable item is a lot number reflecting where and when the consumable item was manufactured.

12. An image-forming device comprising:

an image-forming mechanism to form images on sheets of media using a consumable item, the consumable item including a memory storing a substantially unique identifier of the consumable item designating the consumable item as one of a starter item and a normal item; and, a computer program configured to retrieve the substantially unique identifier from the memory of the consumable item, and determine whether to allow formation of images using the consumable item based on whether the consumable item is a starter item or a normal item, wherein, if the consumable item is a starter item and the image-forming device has previously been powered-on with one of a different starter item and a normal item installed in the image-forming device, the computer program prevents formation of images using the consumable item, wherein, if the consumable item is a starter item and the image-forming device has previously been powered-on with the same starter item installed in the image-forming device, the computer program allows formation of images using the consumable item.

13. The image-forming device of claim 12, further comprising firmware in which the computer program is stored, wherein one of:

the computer program is stored within the firmware when the image-forming device is shipped for purchase and/or usage by the user; and, the computer program is downloaded into the firmware from a computing device over a network.

14. The image-forming device of claim 12, wherein the computer program is further configured to limit the number of starter items useable by the image-forming mechanism to one starter item.

15. The image-forming device of claim 14, wherein the computer program is further configured to permit formation of images using the starter item only if the starter item is installed in the image-forming mechanism when the image-forming mechanism is initially powered-on.

16. A non-transitory computer-readable medium having a computer program stored thereon to perform a method comprising:

retrieving a substantially unique identifier of a consumable item from a memory of the consumable item, the consumable item installed in an image-forming device;

determining whether the consumable item is a starter item based on the substantially unique identifier;

limiting the number of starter items useable by the image-forming mechanism to one starter item; and preventing formation of images using the consumable item if the consumable item is a starter item and the image-forming device has previously been powered-on with one of a different starter item and a normal item installed in the image-forming device, allowing formation of images using the consumable item if the consumable item is a starter item and the image-forming device has previously been powered-on with the same starter item installed in the image-forming device.

17. The non-transitory computer-readable medium of claim 16, further comprising permitting formation of images using the starter item only if the starter item is installed in the image-forming device when the image-forming device is initially powered-on.

18. The method of claim 1, wherein the consumable item designated as the starter item produces a first print yield, and the consumable item designated as the normal item produces a second print yield greater than the first print yield.

19. The image-forming device of claim 12, wherein the consumable item designated as the starter item produces a first print yield, and the consumable item designated as the normal item produces a second print yield greater than the first print yield.

20. The non-transitory computer-readable medium of claim 16, wherein the starter item comprises a consumable item producing a first print yield, and the normal item comprises a consumable item producing a second print yield greater than the first print yield.

* * * * *